United States Patent Office 3,059,004
Patented Oct. 16, 1962

3,059,004
PRODUCTION OF ORGANIC ACIDS
Marinus J. Waale and Johan M. Vos, Amsterdam, Netherlands, assignors to Shell Oil Company, a corporation of Delaware
No Drawing. Filed Dec. 10, 1959, Ser. No. 858,609
Claims priority, application Netherlands Dec. 15, 1958
10 Claims. (Cl. 260—413)

This invention relates to the production of carboxylic acids. The invention relates more particularly to improvements in the production of carboxylic acids from starting materials comprising carbon monoxide, mono-olefinically unsaturated compounds and water.

It is known that organic acids are obtained by contacting mixtures containing carbon monoxide, water and an organic compound, such as for example an olefin, with certain specific catalysts under controlled conditions of temperature and pressure. Many of the processes disclosed heretofore rely upon the use of exceedingly high pressures, often in combination with relatively high temperatures. The practicality of such processes is often further handicapped by inability to produce a particularly desired acid as the predominant reaction product. Processes disclosed heretofore carried out in liquid phase are generally executed under conditions rendering difficult, if not impossible, the maintenance of constant conditions throughout the reaction zone, thereby producing by-products in substantial amounts.

More recently it has been found that with the aid of certain highly acidic catalysts the use of severe reaction conditions, including high pressures, can be avoided if the operation is conducted in two successive stages with the exclusion of water in the first stage and the addition of all of the water required to form the acid in the second stage. In a modification of this type of operation the use of certain specific catalysts enables the addition of a fraction, but not all, of the water of reaction in the first stage of the two stage process.

The need to rely upon two separate reaction stages to complete the desired reaction, each requiring the maintenance of different controlled reaction conditions therein, adds materially to the complexity and cost of the process. A further disadvantage of the two stage type of operation resides in the relatively high catalyst cost generally incurred therein due to the fact that the second stage generally converts the catalyst to a condition in which it is unsuitable for recycling to the system without costly operative recovery procedure.

It is an object of the present invention to provide an improved process enabling the more efficient production of carboxylic acids from olefinically unsaturated compounds, carbon monoxide and water, wherein the above difficulties are obviated to at least a substantial degree.

Another object of the invention is the provision of an improved process enabling the more efficient production of carboxylic acids from olefins having at least three carbon atoms to the molecule, carbon monoxide and water in a single stage, liquid phase, continuous operation.

A particular object of the invention is the provision of an improved process enabling the more efficient production of carboxylic acids having from nine to eleven carbon atoms to the molecule from mono-olefinic hydrocarbons having from eight to ten carbon atoms to the molecule in a single stage, continuous, catalystic, liquid phase operation. Other objects and advantages of the present invention will become apparent from the following detailed description thereof.

In accordance with the invention, carboxylic acids are produced by continuously introducing charge materials consisting essentially of carbon monoxide, an olefinic compound having at least three carbon atoms, an amount of water is at least the stoichiometrical equivalent of said olefinic compound, and a catalyst consisting essentially of a boron trifluoride-inorganic acid complex into a reaction zone, maintaining a substantially homogeneous liquid phase of relatively constant composition at a substantially constant temperature in the range of from about —10 to about 150° C. in said reaction zone throughout the course of said reaction, continuously withdrawing a portion of said liquid phase from said reaction zone, and separating carboxylic acid from the said portion of liquid phase withdrawn from said reaction zone.

Olefinic compounds employed as charge to the process of the invention comprise the mono-olefinically unsaturated organic compounds having at least three carbon atoms to the molecule. Example of such suitable olefinic compounds are the monoolefinic hydrocarbons such as propylene, butylene-1, butylene-2, isobutylene, branched or unbranched pentenes, hexenes, heptenes, octenes, nonenes, decenes and higher alkenes; polymers ond co-polymers of alkenes, such as di-isobutylene, propylene tetramer; cyclic alkenes, such as cyclopentene and cyclohexene, as well as unsaturated fatty acids or hydroxy fatty acids which may form unsaturated fatty acids under the reaction conditions, etc. Commercially available mixtures comprising these alkenes may also be used, for example, olefin-containing hydrocarbon fractions such as obtained by thermal vapor phase cracking or paraffin wax in the presence of steam. These fractions not only contain alkenes but generally also paraffins, naphthenes and aromatics, which usually do not take part in the synthesis. Their presence promotes the separation into layers of the reactor effluence, the same also being true of the alkenes unconverted during the reaction.

The carbon monoxide reactant need not necessarily be pure. Suitable carbon monoxide charge material comprise the commercially available carbon monoxide and carbon monoxide-containing gases. The presence therein of fixed gases and minor amounts of saturated hydrocarbons does not adversely affect the efficiency of the process.

The process of the invention is executed in the presence of a liquid, highly acidic, inorganic compound as catalyst. Suitable catalyst comprise the liquid complex mixtures obtained by combining boron trifluoride, water and a poly basic inorganic acid, such as for example, phosphoric acid, sulfuric acid and the like. Preferred catalysts comprise the complex mixtures of boron trifluoride-phosphoric acid-water containing a mol ratio of phosphoric acid to boron trifluoride in the range of from about 0.8:1.3 to about 1.3:0.8 having a water content of from about 7 to about 12% by weight (based upon total boron trifluoride and phosphoric acid). A particularly preferred catalyst comprises the complex mixtures containing about 1½ molar amount of boron trifluoride for 1 molar amount of phosphoric acid and approximately 10% by weight of water (based upon the total weight of boron trifluoride plus phosphoric acid).

In accordance with the invention the olefinic reactant, carbon monoxide, catalyst and water are continuously introduced into the reaction zone throughout the course of the operation.

The molar ratio of the amount of water to the amount of alkenes charged is generally maintained in the range of from about 1:1 to about 30:1, preferably from about 2:1 to about 6:1. The greater this ratio the greater should be the weight ratio of catalyst supplied to alkenes supplied. The water supplied usually is in the range from about 2 to about 15% by weight of the total quantity of liquid inorganic material (mainly the catalyst) supplied during the same period of time. The catalyst decreases in activity at excessive and too low water to catalyst ratios.

Essential to the attainment of the objects of the invention is the maintaining of the liquid contents of the reaction zone in the form of a substantially homogeneous liquid phase of substantially constant composition throughout the course of the reaction. Essentially constant composition of the reaction zone contents is obtained by controlling and correlating the rate at which materials are charged to the reaction zone and withdrawn therefrom. Thus constant composition of the reaction mixture in the reaction space is obtained at a constant rate of supply of the reactants and of the catalyst, as well as of the materials which may be supplied together with the said components and the catalyst, provided the temperature and pressure are also kept constant and the reaction mixture is kept substantially homogeneous. Small deviations from the constant conditions envisaged may occur during operation, for example, as a result of irregularities or inaccuracies in the working of the apparatus used for the supply of materials. These deviations are, however, readily compensated for by taking appropriate conventional measures to regulate the process.

When the composition of the reaction mixture is constant the concentration of each component remains constant. For each of the components to be reacted therefore the supply per unit of time and per unit of volume should be equal to the sum of consumption and withdrawal. In the case of the product the production per unit of time and per unit of volume should be equal to the withdrawal.

The liquid reaction mixture in the reaction space may comprise one or two phases. With regard to the latter possibility, the term "homogeneous" as used herein and in the attached claims should be understood as comprising the case in which one of the liquid phases is substantially uniformly distributed in the other liquid phase.

Conventional means are employed to maintain the desired state of homogeneity in the liquid contents of the reaction zone. Thus one or more means such as stirring, passage of normally gaseous material therethrough, and the like may be employed within the scope of the invention.

The temperature at which the reaction is carried out generally in the range of from about $-10°$ C. to about $150°$ C. In many cases excellent results are obtained at temperatures in the range $40°$ C. to $100°$ C. The carbon monoxide pressure generally is maintained in excess of about 20 atm. gauge. Suitable values of this pressure are usually in the range of from about 50 to about 150 atm. gauge. The average residence time of the reaction mixture in the reaction space is often in the range of from 1 to 4 hours. The gas phase is preferably vented separately from the reaction zone.

The reaction conditions may be varied within the said limits according to the type of the alkenes to be converted and the specific catalyst selected for this purpose. With the use of liquid complex mixtures of phosphoric acid, boron trifluoride and water, in which the $H_3PO_4:BF_3$ mol ratio is in the range of from about $0.8:1.3$ to about $1.3:0.8$, preference is given to: a water content of from 7 to 12% by weight (based on the mixture of $H_3PO_4$, $BF_3$ and $H_2O$ at the inlet), temperatures in the range of from about $40°$ C. to about $80°$ C. and CO pressures of from about 50 to about 150 atm. gauge. Lower or higher water contents may be used in accordance with increase or decrease in the $H_3PO_4:BF_3$ ratio. With the use of sulphuric acid containing 4 to 10% by weight of water the reaction will be preferably executed at about room temperature and at the higher pressures within the specified range.

A particular advantage of the process of the invention resides in the ability to carry out the desired reaction therein at optimum conditions for the reaction mixture as a whole throughout the entire reaction zone; i.e., conditions under which alkenes are converted at a relatively high reaction rate to carboxylic acids and at a relatively low reaction rate to such undesirable by-products as polymers.

Composition of the reaction mixture in the reaction space is obtained at a constant rate of supply of the reactants and of the catalyst, as well as of the materials which may be supplied together with the said components and the catalyst, provided the temperature and pressure are also kept constant and the reaction mixture is kept substantially homogeneous. Small deviations from the constant conditions envisaged may occur during operation, for example, as a result of irregularities or inaccuracies in the working of the apparatus used for the supply of materials. These deviations are, however, readily compensated for by taking appropriate conventional measures to regulate the process.

When the composition of the reaction mixture is constant the concentration of each component remains constant. For each of the components to be reacted therefore the supply per unit of time and per unit of volume should be equal to the sum of consumption and withdrawal. In the case of the product the production per unit of time and per unit of volume should be equal to the withdrawal.

Conventional means are employed to maintain the desired state of homogeneity in the liquid contents of the reaction zone. Thus one or more means such as stirring, passage of normally gaseous material therethrough, and the like may be employed within the scope of the invention. As a consequence of the maintaining of the above defined catalytic reaction conditions, comprising the maintaining of liquid contents of the reaction zone in the form of a homogeneous, liquid phase of substantially constant composition, water can now be added in an amount sufficient to form the desired acid directly to the single reaction zone, and the carboxylic acids produced efficiently at moderate conditions of temperature and pressure in a continuous single stage operation.

Reactor effluence in the process of the invention may be worked up in the conventional manner. After releasing the presssure and degassing, it may, if it has not already separated into two layers of its own accord, be separated by the addition of a suitable organic diluent. Suitable diluents comprise the normally liquid hydrocarbons, for example, a gasoline fraction having a boiling range of from about $60°$ to about $80°$ C. The addition of the diluent facilitates the separation of the reactor effluence into two layers, viz., an organic phase containing the carboxylic acid product and an inorganic catalyst-containing phase. The latter may be recycled to the reaction zone after the addition of sufficient water thereto to replace that consumed in the reaction. The water may optionally be introduced, in part or entirety, as a separate stream into the system.

Fatty acid products are recovered from the organic phase by conventional methods, preferably after the removal of the last traces of catalyst therefrom. Removal of residual catalyst may comprise such steps as washing with water and the like. Recovery of the product carboxylic acids may comprise such steps as, for example, ester or salt formation, extraction, crystallization, decantation, distillation with or without steam, etc.

Under the above-defined conditions olefins having at least three carbon atoms to the molecule result in a reaction mixture in which the predominating organic acid is a secondary or tertiary carboxylic acid. Propylene results in isobutyric acid; butene-1 and butene-2 in 2-methyl butyric acid; isobutylene in trimethylacetic acid; cyclohexene in acids comprising methyl cyclopentane carboxylic acid and cyclohexane carboxylic acid; etc. Mixtures of olefins will result in the obtaining of mixtures of fatty acids having on the average one more carbon atom to the molecule than the olefinic components of the charge.

The process of the invention is further illustrated by the following example:

Example

The starting alkenes were a fraction of a product obtained by thermal vapor phase cracking of a paraffinic feedstock in the presence of steam. This fraction contained chiefly alkenes having from 8 to 10 carbon atoms. The original diene content had disappeared as a result of partial hydrogenation. In percentages by weight the mono-alkene content was 76%, in addition to which 17% of saturated hydrocarbons and 7% of aromatics were present. Of the said 76% of mono-alkenes, 38.5% were unbranched, 20% branched and 17.5% cyclic alkenes. The mono-alkenes mainly had a cis- or trans-configuration, only 2% were alpha-alkenes, while 1% had a $CH_2=CR_1R_2$ structure (in which $R_1$ and $R_2$ are alkyl groups).

The catalyst used contained equimolar amounts of $H_3PO_4$ and $BF_3$, and also water. When the catalyst was introduced into the reaction space, the water content, based on the sum of $H_3PO_4$, $BF_3$ was about 10% by weight.

The reaction was carried out in a cylindrical, stainless steel 5 liter reaction vessel which had a spherical bottom. The reactor was provided with a mechanically driven stirrer, a steam or water jacket for raising the reaction mixture to the desired temperature, supply lines for alkenes, carbon monoxide and catalyst, and discharge lines for liquid reaction mixture and the gas phase. The volume of liquid reaction mixture in the reaction vessel was kept at 3 liters.

The molar ratio of water to alkenes supplied to the reaction vessel was varied between 3 and 25. The carbon monoxide pressure was varied between 36 and 100 atm. gauge. The temperature in the reaction vessel was kept at 60° C. The contents of the reaction vessel were stirred at a speed of 750 r.p.m. In each experiment the reaction vessel remained in continuous operation for 1500 hours. The results shown in the following table relate to the period between the 600th and 1500th hour.

The reactor effluence was led to a separator in which two layers formed. The bottom layer (the catalyst layer) was passed from the separator to a buffer vessel to which sufficient water was added for the water content to be about 10% by weight, based on the total amount of the inorganic material present. The catalyst layer also contained organic material in an amount which during the reaction was able to increase to an average of 16% by weight, based on the sum of inorganic and organic material. In some experiments the organic material content in the catalyst was lower owing to the supply of fresh catalyst, but this fact had little effect on the results. The catalyst with the organic material present therein was returned from the buffer vessel to the reaction vessel.

The top layer was removed from the separator and freed from inorganic acid compounds by water-washing. The washing water was then used in order to bring the catalyst to the desired water content.

The fatty acids were then converted into their sodium salts by adding a 25% solution of aqueous NaOH in 5% excess. The solution of the soaps was separated from unconverted alkenes and by-products; extracted with a light, aromatic-free gasoline; acidified with HCl; and again extracted with an aromatic-free gasoline.

The gasoline was distilled from the last extract obtained, after which the remaining fatty acid mixture was fractionated in vacuo; a column having 7 theoretical plates and a 4:1 reflux ratio being employed. At a pressure of 3 mm. mercury temperatures in the range 101° C. to 125° C. were measured at the top of the column. Fourteen fractions were obtained, of which the average molecular weight, determined from the acid numbers, rose from 157 to 182 (theory: $C_8H_{17}COOH=158$, $C_{10}H_{21}COOH=186$).

The conditions, in so far as they differed in the various experiments, are listed in the following table which also shows the conversions and yields. The figures under the heading "alkene" are grams per hour of the hydrocarbon mixture supplied which, as stated above, contained 76% by weight of alkenes. In the molar ratio of $H_2O$ to alkene no other hydrocarbons are included except alkenes. Under the heading "catalyst" is given the number of grams per hour of the catalyst including the organic material present therein and after the water content had been made up. The percentage of total converted alkene is based on the alkene content of the feed.

A comparison of experiments 2, 3 and 4 shows the favorable effect which an increasing ratio of water-containing catalyst to alkene has on conversion (last column) and selectivity (last column but one). A comparison of experiments 1, 5 and 6 shows the favorable effect of increasing the CO pressure. Experiment 1 is considered the most favorable, since a high production capacity of the reactor (see first column) is retained therein with a reasonable conversion and selectivity.

| No. | Feed g./hour "Alkene" | Feed g./hour "Catalyst" | Organic Material in Catalyst Supplied, percent by Weight | Water to Inorganic Material in Catalyst, percent by Weight | Mol Ratio of $H_2O$ to Alkene in Feed | CO-Pressure Atm. Gauge | Residence Time, hours | Fatty Acid, mol percent to Converted Alkene | Total of Converted Alkene percent |
|---|---|---|---|---|---|---|---|---|---|
| 1 | 275 | 1,175 | 11.7 | 9.9 | 3.4 | 100 | 2.7 | 67 | 80 |
| 2 | 264 | 2,475 | 15.8 | 10.2 | 7.4 | 100 | 1.6 | 63 | 85 |
| 3 | 134 | 2,400 | 12.3 | 9.7 | 14.0 | 100 | 1.8 | 83 | 93 |
| 4 | 77 | 2,425 | 9.0 | 9.6 | 25.0 | 100 | 1.9 | 90 | 96 |
| 5 | 264 | 1,155 | 10.2 | 10.2 | 3.7 | 71 | 2.8 | 60 | 84 |
| 6 | 268 | 1,170 | 11.4 | 9.7 | 3.5 | 36 | 2.8 | 52 | 68 |

A separation process, entirely consisting of distillations, was also applied to samples of the crude products still containing the unconverted alkenes, but from which the catalyst had already been removed by washing. The alkenes were distilled off at atmospheric pressure, after which the fatty acids were distilled in vacuo. The resulting fatty acid fractions were less pure than those resulting from the method discussed above in the example, this being offset by a simpler process. The fatty acids separated in such simple manner were, however, found to be sufficiently pure for satisfactory use in various practical scale applications.

We claim as our invention:

1. The continuous, single stage process for the production of mono-carboxylic acids having from about four to about thirteen carbon atoms to the molecule which comprises continuously introducing charge materials consisting essentially of carbon monoxide, a mono-olefinic hydrocarbon having from about three to about twelve carbon atoms to the molecule, an amount of water which is at least the stoichiometrical equivalent of said olefinic compound, and a catalyst consisting essentially of a liquid complex obtained by combining boron trifluoride, an inorganic acid selected from the group consisting of phosphoric acid and sulfuric acid, and an amount of water in the range of from about 7 to about 12% by weight of said acid, into a reaction zone, maintaining a substantially homogeneous liquid phase of relatively constant composition at a temperature in the range of from about −10 to about 150° C., and under a pressure in excess of about 20 atmospheres in said reaction zone throughout the course of said process, continuously withdrawing a portion of said liquid phase from said reaction zone, and separating carboxylic acid from said portion of liquid phase withdrawn from said reaction zone.

2. The continuous, single stage process for the production of mono-carboxylic acids having from about four to about thirteen carbon atoms to the molecule which comprises continuously introducing charge material consisting essentially of carbon monoxide, a mono-olefinic hydrocarbon having from about three to about twelve carbon atoms to the molecule, an amount of water which is in the range of from about 1 to about 30 times the molar equivalent of said olefinic compound, and a liquid catalyst consisting essentially of a boron trifluoride-phosphoric acid-water complex containing from about 7 to about 12% water based on the combined weight of said acids into a reaction zone, maintaining the non-gaseous content of said reaction zone in substantially homogeneous, liquid phase of relatively constant composition at a temperature in the range of from about −10 to about 150° C. and under a pressure in excess of about 20 atmospheres throughout the course of the reaction, continuously withdrawing a portion of said liquid phase from said reaction zone, and separating carboxylic acid from said portion of liquid phase withdrawn from said reaction zone.

3. The process in accordance with claim 2 wherein said liquid catalyst contains a molar ratio of boron trifluoride to phosphoric acid in the range of from about 0.8 to 1.3 to about 1.3 to 0.8.

4. The continuous, single stage process for the production of mono-carboxylic acids having from about four to about thirteen carbon atoms to the molecule which comprises continuously introducing charge materials consisting essentially of carbon monoxide, a mono-olefinic hydrocarbon having from about 3 to about 12 carbon atoms to the molecule, an amount of water which is in the range of from about 1 to about 30 times the stoichiometrical equivalent of said olefinic compound, and a liquid catalyst consisting essentially of a boron trifluoride-phosphoric acid water complex containing from about 7 to about 12% by weight of water based on the combined weight of said acids into a reaction zone, maintaining the non-gaseous components in said reaction zone in substantially homogeneous liquid phase of relatively constant composition at a temperature of from about 40 to about 80° C. and under a pressure of from about 20 to about 150 atmospheres throughout the course of said process, continuously withdrawing a portion of said liquid phase from said reaction zone, and separating carboxylic acid from said portion of liquid phase withdrawn from said said reaction zone.

5. The process in accordance with claim 4 wherein said catalyst contains a molar ratio of boron trifluoride to phosphoric acid in the range of from about 0.8 to 1.3 to about 1.3 to 0.8.

6. The process in accordance with claim 4 wherein said catalyst contains approximately 1½ molar amount of boron trifluoride for 1 molar amount of phosphoric acid.

7. The continuous single stage process for the production of carboxylic acids having from 9 to 11 carbon atoms to the molecule in a single stage continuous operation which comprises continuously introducing charge materials consisting essentially of carbon monoxide, mono-olefinic hydrocarbons having from 8 to 10 carbon atoms to the molecule, an amount of water in excess of but not substantially greater than 30 times the stoichiometrical equivalent of the amount of said mono-olefinic hydrocarbons, and a liquid catalyst consisting essentially of boron trifluoride-phosphoric acid water complex containing from about 7 to about 12% by weight of water based on the combined weight of said acids into a reaction zone, maintaining the non-gaseous components in said reaction zone in substantially homogeneous liquid phase of substantially constant composition at a temperature of from about 40 to about 80° C. under a pressure of from about 50 to about 150 atmospheres throughout the course of the process, continuously withdrawing a portion of said liquid phase from said reaction zone, and separating carboxylic acid having from 9 to 11 carbon atoms to the molecule from said portion of liquid phase withdrawn from said reaction zone.

8. The process in accordance with claim 7 wherein said liquid catalyst contains a mole ratio of boron trifluoride to phosphoric acid in the range of from about 0.8 to 1.3 to about 1.3 to 0.8.

9. The production of a mono-carboxylic acid having from about four to about thirteen carbon atoms to the molecule in a single stage continuous operation which comprises continuously introducing carbon monoxide, a mono-olefinic hydrocarbon having from about three to about twelve carbon atoms to the molecule, a liquid catalyst consisting essentially of a boron trifluoride-phosphoric acid complex containing from about 7 to about 12% by weight of water, and an amount of water equal to from about three to about twenty-five times the stoichiometrical equivalent of said olefin into a reaction zone, maintaining a substantially homogeneous liquid phase of relatively constant composition at a temperature of from about 40 to about 80° C. at a pressure of from about 20 to about 150 atmospheres in said reaction zone throughout the course of said operation, continuously withdrawing a portion of said liquid phase from said reaction zone, and separating carboxylic acid having at least four carbon atoms to the molecule from said portion of liquid phase withdrawn from said reaction zone.

10. The production of mono-carboxylic acids having from about four to about thirteen carbon atoms to the molecule in a single stage continuous operation which comprises continuously introducing carbon monoxide, a mono-olefinic hydrocarbon having from about three to about twelve carbon atoms to the molecule, an amount of water which is in the range of from about three to about twenty-five times the stoichiometrical equivalent of said olefin, and a liquid catalyst consisting essentially of a boron trifluoride-sulfuric acid complex containing from about 4 to about 10% by weight of water into a reaction zone, maintaining a substantially homogeneous liquid phase of relatively constant composition at a temperature of about 20° C. and a pressure of from about 50 to about 150 atmospheres in said reaction zone throughout the course of said operation, continuously withdrawing a portion of said liquid phase from said reaction zone, and recovering carboxylic acid having at least four carbon atoms to the molecule from said portion of liquid phase withdrawn from said reaction zone.

References Cited in the file of this patent

UNITED STATES PATENTS

| | | |
|---|---|---|
| 2,876,241 | Koch et al. | Mar. 3, 1959 |
| 2,911,422 | Ercoli | Nov. 3, 1959 |